United States Patent [19]

Minarovic

[11] Patent Number: 5,901,631
[45] Date of Patent: May 11, 1999

[54] WOOD NOTCHING SYSTEM

[76] Inventor: Mike Minarovic, 1801 Allegheney Dr., Blakeslee, Pa. 18610

[21] Appl. No.: 08/932,524

[22] Filed: Sep. 18, 1997

[51] Int. Cl.[6] .................................................. B26D 11/00
[52] U.S. Cl. .......................... 83/862; 83/879; 83/477.2; 83/699.61; 144/3.1; 144/368
[58] Field of Search .......................... 83/699.51, 699.61, 83/477.2, 856, 862, 863, 865, 881, 879, 875; 144/3.1, 42, 368

[56] References Cited

U.S. PATENT DOCUMENTS

| | | | |
|---|---|---|---|
| Re. 32,986 | 7/1989 | Dettelbach et al. | 83/863 |
| 4,706,535 | 11/1987 | Ducharme | 83/863 |
| 4,829,868 | 5/1989 | Jenker | 83/863 |
| 5,117,722 | 6/1992 | Letendre | 83/863 |
| 5,193,428 | 3/1993 | Letendre | 83/863 |

*Primary Examiner*—Peter Vo
*Assistant Examiner*—Kevin G. Vereene

[57] ABSTRACT

A new wood notching system for cutting grooves into wood before the wood is to be cut by a saw. The inventive device includes an elongated throat plate positioned within an elongated opening in a table top saw. The throat plate has a large slotted aperture and a small slotted aperture therethrough. The large slotted aperture receives a saw blade of the table top saw therethrough. A scoring knife is adjustably received within the small slotted aperture of the throat plate. The scoring knife is adjustable in an up and down orientation and a side to side orientation. The scoring knife has a sharpened upper edge and an aperture through a lower portion thereof.

6 Claims, 2 Drawing Sheets

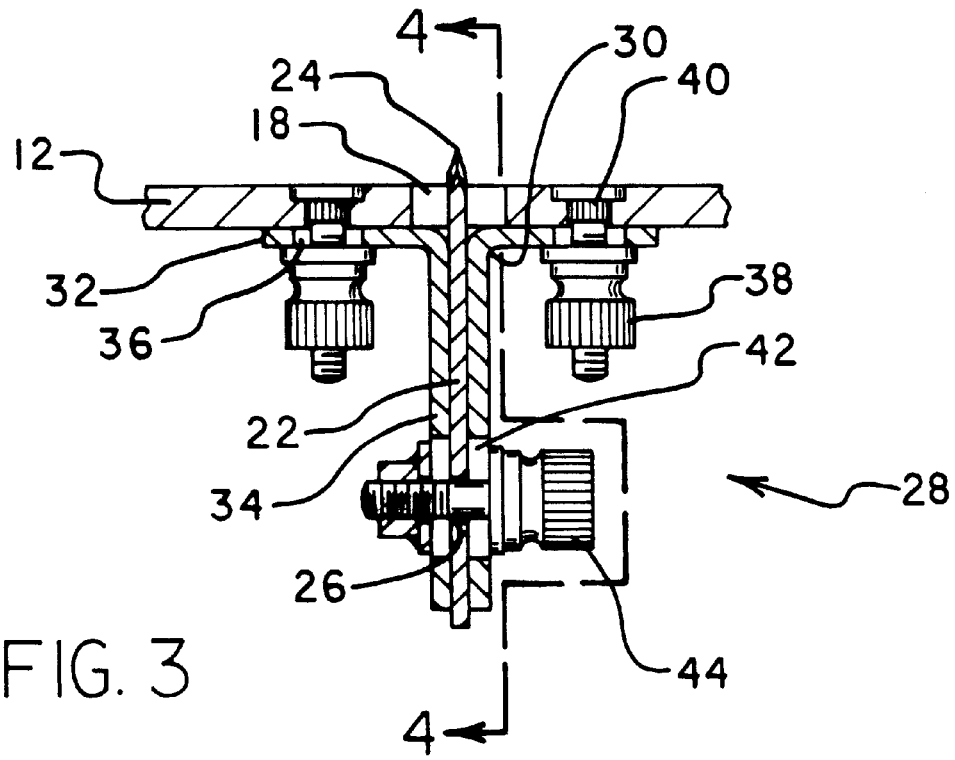
FIG. 3
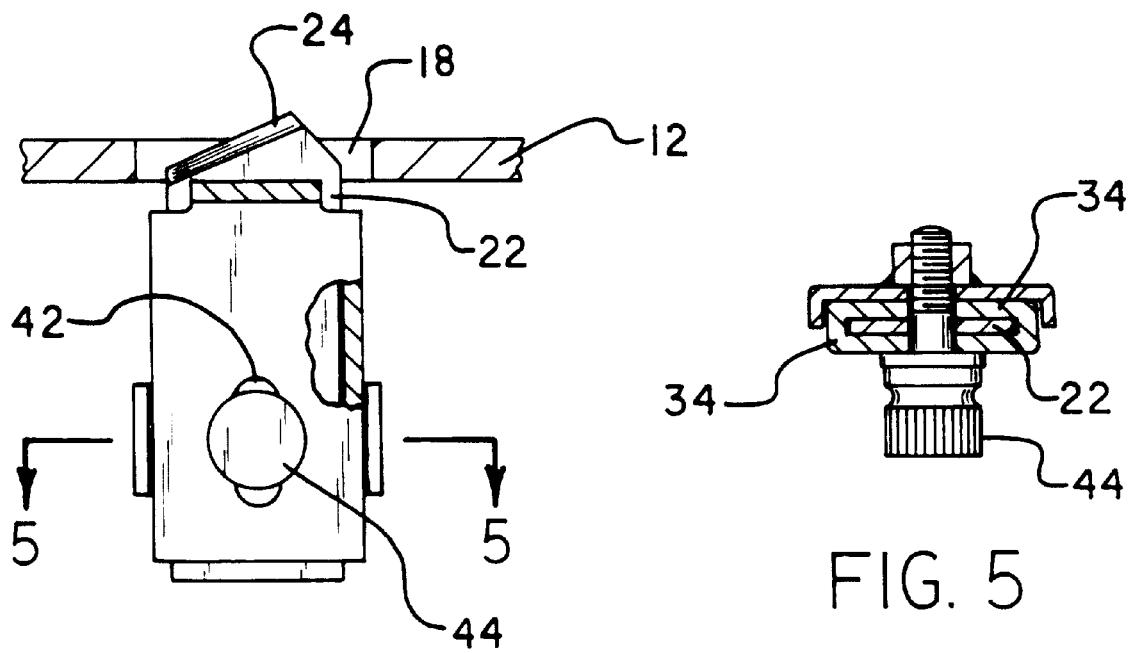
FIG. 4
FIG. 5

WOOD NOTCHING SYSTEM

BACKGROUND OF THE INVENTION

1. Field of the Invention the present invention relates to scoring saws and more particularly pertains to a new wood notching system for cutting grooves into wood before the wood is to be cut by a saw.

2. Description of the Prior Art

The use of scoring saws is known in the prior art, more specifically, scoring saws heretofore devised and utilized are known to consist basically of familiar, expected and obvious structural configurations, notwithstanding the myriad of designs encompassed by the crowded prior art which have been developed for the fulfillment of countless objectives and requirements.

Known prior art scoring saws include U.S. Pat. No. 5,159,864 to Wedemeyer et al.; U.S. Pat. No. 4,245,390 to Bond; U.S. Pat. No. 4,706,535 to Ducharme; U.S. Pat. No. 4,176,572 to Pennington; U.S. Pat. No. 4,087,914 to Bates; and U.S. Pat. No. Des. 354,757 to Wixey.

While these devices fulfill their respective, particular objectives and requirements, the aforementioned patents do not disclose a new wood notching system. The inventive device includes an elongated throat plate positioned within an elongated opening in a table top saw. The throat plate has a large slotted aperture and a small slotted aperture therethrough. The large slotted aperture receives a saw blade of the table top saw therethrough. A scoring knife is adjustably received within the small slotted aperture of the throat plate. The scoring knife is adjustable in an up and down orientation and a side to side orientation. The scoring knife has a sharpened upper edge and an aperture through a lower portion thereof.

In these respects, the wood notching system according to the present invention substantially departs from the conventional concepts and designs of the prior art, and in so doing provides an apparatus primarily developed for the purpose of cutting grooves into wood before the wood is to be cut by a saw.

SUMMARY OF THE INVENTION

In view of the foregoing disadvantages inherent in the known types of scoring saws now present in the prior art, the present invention provides a new wood notching system construction wherein the same can be utilized for cutting grooves into wood before the wood is to be cut by a saw.

The general purpose of the present invention, which will be described subsequently in greater detail, is to provide a new wood notching system apparatus and method which has many of the advantages of the scoring saws mentioned heretofore and many novel features that result in a new wood notching system which is not anticipated, rendered obvious, suggested, or even implied by any of the prior art scoring saws, either alone or in any combination thereof.

To attain this, the present invention generally comprises an elongated throat plate positioned within an elongated opening in a table top saw. The throat plate has a large slotted aperture and a small slotted aperture therethrough. The large slotted aperture receives a saw blade of the table top saw therethrough. A scoring knife is adjustably received within the small slotted aperture of the throat plate. The scoring knife is adjustable in an up and down orientation and a side to side orientation. The scoring knife has a sharpened upper edge and an aperture through a lower portion thereof.

A knife adjustment system is adapted for adjusting the scoring knife in the up and down orientation and the side to side orientation with respect to the throat plate. The knife adjustment system includes a pair of inverted L-shaped brackets positioned on opposing sides of the scoring knife. The L-shaped brackets include upper horizontal segments and lower vertical segments. The upper horizontal segments each have slots therethrough for slidably receiving adjustment knobs therein. The adjustments knobs couple with fixed studs disposed within the throat plate on opposing sides of the small slotted aperture. The lower vertical segments parallel the scoring knife. The lower vertical segments have slots therethrough in alignment with the aperture in the lower portion of the scoring knife. An adjustment knob extends through the slots of the lower vertical segments and the aperture of the scoring knife.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new wood notching system apparatus and method which has many of the advantages of the scoring saws mentioned heretofore and many novel features that result in a new wood notching system which is not anticipated, rendered obvious, suggested, or even implied by any of the prior art scoring saws, either alone or in any combination thereof.

It is another object of the present invention to provide a new wood notching system which may be easily and efficiently manufactured and marketed.

It is a further object of the present invention to provide a new wood notching system which is of a durable and reliable construction.

An even further object of the present invention is to provide a new wood notching system which is susceptible of a low cost of manufacture with regard to both materials and labor, and which accordingly is then susceptible of low prices of sale to the consuming public, thereby making such wood notching system economically available to the buying public.

Still yet another object of the present invention is to provide a new wood notching system which provides in the apparatuses and methods of the prior art some of the advantages thereof, while simultaneously overcoming some of the disadvantages normally associated therewith.

Still another object of the present invention is to provide a new wood notching system for cutting grooves into wood before the wood is to be cut by a saw.

Yet another object of the present invention is to provide a new wood notching system which includes an elongated throat plate positioned within an elongated opening in a table top saw. The throat plate has a large slotted aperture and a small slotted aperture therethrough. The large slotted aperture receives a saw blade of the table top saw therethrough. A scoring knife is adjustably received within the small slotted aperture of the throat plate. The scoring knife is adjustable in an up and down orientation and a side to side orientation. The scoring knife has a sharpened upper edge and an aperture through a lower portion thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken along line 3—3 of FIG. 2.

FIG. 4 is a cross-sectional view of the present invention as taken along line 4—4 of FIG. 3.

FIG. 5 is a cross-sectional view of the present invention as taken along line 5—5 of FIG. 4.

DESCRIPTION OF THE PREFERRED EMBODIMENT

Figure 1:
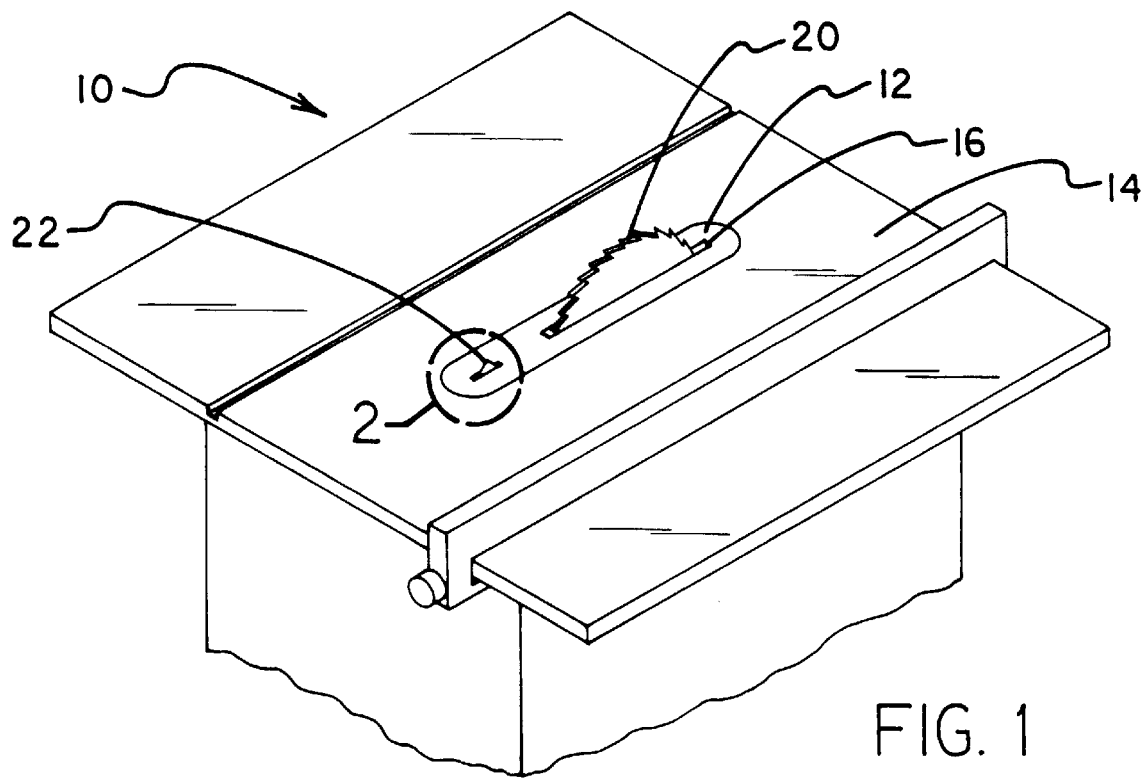
FIG. 1 is a perspective view of a new wood notching system according to the present invention.
Figure 2:
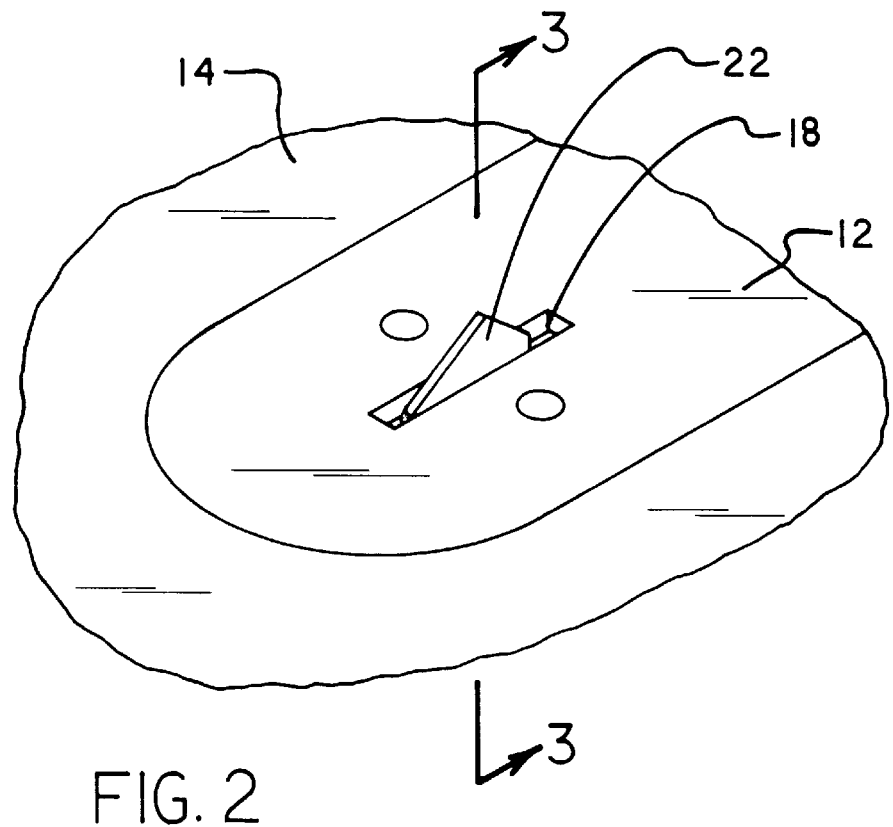
FIG. 2 is a sectional perspective view of the present invention as taken from circle 2 of FIG. 1.

With reference now to the drawings, and in particular to FIGS. 1 through 5 thereof, a new wood notching system embodying the principles and concepts of the present invention and generally designated by the reference numeral 10 will be described.

As best illustrated in FIGS. 1 through 5, the wood notching system 10 comprises an elongated throat plate 12 positioned within an elongated opening in a table top saw 14. The throat plate 12 has a large slotted aperture 16 and a small slotted aperture 18 therethrough. The large slotted aperture 16 receives a saw blade 20 of the table top saw 14 therethrough.

A scoring knife 22 is adjustably received within the small slotted aperture 18 of the throat plate 12. The scoring knife 22 is adjustable in an up and down orientation and a side to side orientation. The scoring knife 22 has a sharpened upper edge 24 and an aperture 26 through a lower portion thereof.

A knife adjustment system 28 is adapted for adjusting the scoring knife 22 in the up and down orientation and the side to side orientation with respect to the throat plate 12. The knife adjustment system 28 includes a pair of inverted L-shaped brackets 30 positioned on opposing sides of the scoring knife 22. The L-shaped brackets 30 include upper horizontal segments 32 and lower vertical segments 34. The upper horizontal segments 32 each have slots 36 therethrough for slidably receiving adjustment knobs 38 therein. The adjustments knobs 38 couple with fixed studs 40 disposed within the throat plate 12 on opposing sides of the small slotted aperture 18. The lower vertical segments 34 parallel the scoring knife 22. The lower vertical segments 34 have slots 42 therethrough in alignment with the aperture 26 in the lower portion of the scoring knife 22. An adjustment knob 44 extends through the slots 42 of the lower vertical segments 34 and the aperture 26 of the scoring knife 22. The user simply loosens the adjustment knobs 38,44 to adjust the scoring knife 22 with respect to the throat plate 12 and thus the saw blade 20.

In use, the scoring knife 22 is disposed forwardly of the saw blade 20 of the table saw 14. The table saw 14 could include band saws, standard table saws and scroll saws. The scoring knife 22 will cut a groove into the piece of wood before being cut by the saw blade 20. The precut groove could create a perfect guide for the execution of flawless cuts. Modifications could also be made for handheld circular and sabre saws so these tools could be fitted with the device 10. Once the scoring knife 22 is worn, it could be removed from the saw and replaced.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wood notching system for cutting grooves into wood before the wood is to be cut by a saw comprising, in combination:

an elongated throat plate positioned within an elongated opening in a table top saw, the throat plate having a large slotted aperture and a small slotted aperture therethrough, the large slotted aperture receiving a saw blade of the table top saw therethrough;

a scoring knife adjustably received within the small slotted aperture of the throat plate, the scoring knife being adjustable in an up and down orientation and a side to side orientation, the scoring knife having a sharpened upper edge and an aperture through a lower portion thereof;

a knife adjustment system adapted for adjusting the scoring knife in the up and down orientation and the side to side orientation with respect to the throat plate, the knife adjustment system including a pair of inverted L-shaped brackets positioned on opposing sides of the scoring knife, the L-shaped brackets including upper horizontal segments and lower vertical segments, the tipper horizontal segments each having slots therethrough for slidably receiving adjustment knobs therein, the adjustments knobs coupling with fixed studs disposed within the throat plate on opposing sides of the small slotted aperture, the lower vertical segments paralleling the scoring knife, the lower vertical segments having slots therethrough in alignment with the aperture in the lower portion of the scoring knife, an adjustment knob extending through the slots of the lower vertical segments and the aperture of the scoring knife.

2. A wood notching system for cutting grooves into wood before the wood is to be cut by a saw comprising, in combination:

an elongated throat plate positioned within an elongated opening in a table top saw, the throat plate having a large slotted aperture and a small slotted aperture therethrough, the large slotted aperture receiving a saw blade of the table top saw therethrough; and a scoring knife having a single sharpened surface, the scoring knife being adjustably fixable between a pair of inverted L-shaped brackets such that the scoring knife is held in a static position during use of the wood notching system, the scoring knife extending upwardly through the small slotted aperture of the throat plate, the scoring knife being adjustable in an up and down orientation and a side to side orientation, the single sharpened surface being a sharpened upper edge, the scoring knife further having an aperture through a lower portion thereof.

3. The wood notching system as set forth in claim 2 and further including a knife adjustment system adapted for adjusting the scoring knife in the up and down orientation and the side to side orientation with respect to the throat plate.

4. A wood notching system for cutting grooves into wood before the wood is to be cut by a saw comprising, in combination:

an elongated throat plate positioned within an elongated opening in a table top saw, the throat plate having a large slotted aperture and a small slotted aperture therethrough, the large slotted aperture receiving a saw blade of the table top saw therethrough; and a scoring knife adjustably received within the small slotted aperture of the throat plate, the scoring knife being adjustable in an up and down orientation and a side to side orientation, the scoring knife having a sharpened upper edge and an aperture through a lower portion thereof; a knife adjustment system adapted for adjusting the scoring knife in the up and down orientation and the side to side orientation with respect to the throat plate; and wherein the knife adjustment system includes a pair of inverted L-shaped brackets positioned on opposing sides of the scoring knife, the L-shaped brackets including upper horizontal segments and lower vertical segments, the upper horizontal segments each having slots therethrough for slidably receiving adjustment knobs therein, the adjustments knobs coupling with fixed studs disposed within the throat plate on opposing sides of the small slotted aperture, the lower vertical segments paralleling the scoring knife.

5. The wood notching system as set forth in claim 4 wherein the lower vertical segments have slots therethrough in alignment with the aperture in the lower portion of the scoring knife, an adjustment knob extending through the slots of the lower vertical segments and the aperture of the scoring knife.

6. A wood notching system for cutting grooves into wood before the wood is to be cut by a saw comprising, in combination:

an elongated throat plate positioned within an elongated opening in a table top saw, the throat plate having a first slot and a second slot therethrough, the first slot being larger than the second slot, the first slot receiving a saw blade of the table top saw therethrough;

a scoring knife having a single sharpened surface, the scoring knife further being substantially vertical front and back edges and an upper edge extending between the front and back edges, the upper edge having a front portion extending upwardly from the front edge to an apex of the upper edge, the upper edge having a back portion extending downwardly from the apex of the upper edge to the back edge, the scoring knife adjustably received within the second slot of the throat plate, the scoring knife being adjustable in a substantially vertical plane and in a substantially horizontal plane transverse to a longitudinal axis of the second slot, the scoring knife having a sharpened upper edge and an aperture through a lower portion thereof;

a knife adjustment system adapted for adjusting the scoring knife in the vertical plane and the horizontal plane transverse to the longitudinal axis of the second slot, the knife adjustment system including a pair of inverted L-shaped brackets positioned on opposing sides of the scoring knife, the L-shaped brackets including substantially horizontal upper segments and substantially vertical lower segments, the upper segments each having slots therethrough for slidably receiving adjustment knobs therein, the adjustments knobs being couplable with fixed studs disposed within the throat plate, the fixed studs being positioned on opposing sides of the second slot, the lower segments being positioned substantially parallel to the scoring knife, the lower segments having slots therethrough in alignment with the aperture in the lower portion of the scoring knife, an adjustment knob extending through the slots of the lower segments and the aperture of the scoring knife.

* * * * *